United States Patent
Tolfsen et al.

(10) Patent No.: US 6,802,537 B1
(45) Date of Patent: Oct. 12, 2004

(54) ARRANGEMENT AND METHOD FOR HEIGHT ADJUSTMENT OF THE UPPER ATTACHMENT POINT OF A SAFETY BELT

(75) Inventors: Ulf Tolfsen, Gamle Fredrikstad (NO); Johan Horsrud, Manstad (NO)

(73) Assignee: Volvo Lastvagnar AB, Göteborg (SE)

( * ) Notice: Subject to any disclaimer, the term of this patent is extended or adjusted under 35 U.S.C. 154(b) by 43 days.

(21) Appl. No.: 10/088,585

(22) PCT Filed: Oct. 2, 2000

(86) PCT No.: PCT/SE00/01892

§ 371 (c)(1),
(2), (4) Date: May 21, 2002

(87) PCT Pub. No.: WO01/26937

PCT Pub. Date: Apr. 19, 2001

(30) Foreign Application Priority Data

Oct. 12, 1999 (SE) ............................... 9903690

(51) Int. Cl.⁷ ............................................ B60R 22/20
(52) U.S. Cl. ................... 280/801.2; 280/801.1; 280/802; 280/803; 280/804; 280/805; 280/727; 297/484
(58) Field of Search ............................ 280/801.1, 801.2, 280/802, 803, 804, 805, 727; 297/484

(56) References Cited

U.S. PATENT DOCUMENTS

| | | | |
|---|---|---|---|
| 3,781,034 A | * 12/1973 | Botnick et al. ............. 280/804 |
| 4,173,357 A | * 11/1979 | Jahn et al. ................ 280/801.2 |
| 4,470,618 A | * 9/1984 | Ono .......................... 280/801.2 |
| 4,542,919 A | * 9/1985 | Else ............................. 280/804 |
| 4,726,605 A | * 2/1988 | Carter ...................... 280/801.1 |
| 4,807,715 A | * 2/1989 | Nagashima et al. ........ 180/268 |
| 5,015,010 A | * 5/1991 | Homeier et al. ............ 280/808 |
| 5,020,856 A | * 6/1991 | George ........................ 297/483 |
| 5,102,166 A | 4/1992 | Bogner |
| 5,141,249 A | * 8/1992 | Saitoh et al. ................ 280/804 |
| 5,294,150 A | * 3/1994 | Steffens, Jr. ........... 2810/801.2 |
| 5,366,243 A | * 11/1994 | Ray et al. ................ 280/801.2 |
| 5,366,244 A | * 11/1994 | Lane, Jr. .................. 280/801.2 |
| 5,709,408 A | * 1/1998 | Carraway, Jr. .............. 280/804 |
| 5,884,940 A | * 3/1999 | Baumann et al. ......... 280/801.2 |
| 5,908,205 A | * 6/1999 | Griesemer ............... 280/801.2 |

FOREIGN PATENT DOCUMENTS

| | | | |
|---|---|---|---|
| DE | 2625417 | * | 6/1976 |
| DE | 2625417 A1 | | 12/1977 |
| DE | 3222808 | * | 12/1983 |
| DE | 3222808 A1 | | 12/1983 |
| DE | 3539399 | * | 5/1987 |
| DE | 3539399 A1 | | 5/1987 |
| DE | 4018294 | * | 11/1991 |
| DE | 4018294 A1 | | 12/1991 |
| DE | 4018294 | * | 12/1991 |
| EP | 0447364 A1 | | 9/1991 |

* cited by examiner

*Primary Examiner*—Jack Keith
*Assistant Examiner*—John Richardson
(74) *Attorney, Agent, or Firm*—Birch, Stewart, Kolasch & Birch, LLP

(57) ABSTRACT

The invention relates to an arrangement and a method for height adjustment of the upper attachment point of a safety belt, arranged in a vehicle with a vehicle seat which is spring-mounted in the vertical direction, where the upper attachment point is arranged displaceably in the vertical direction on the body of the vehicle. Said height adjustment takes place as a function of the springing movement of the vehicle seat, which results in the upper attachment point always remaining correctly positioned in the vertical direction.

11 Claims, 4 Drawing Sheets

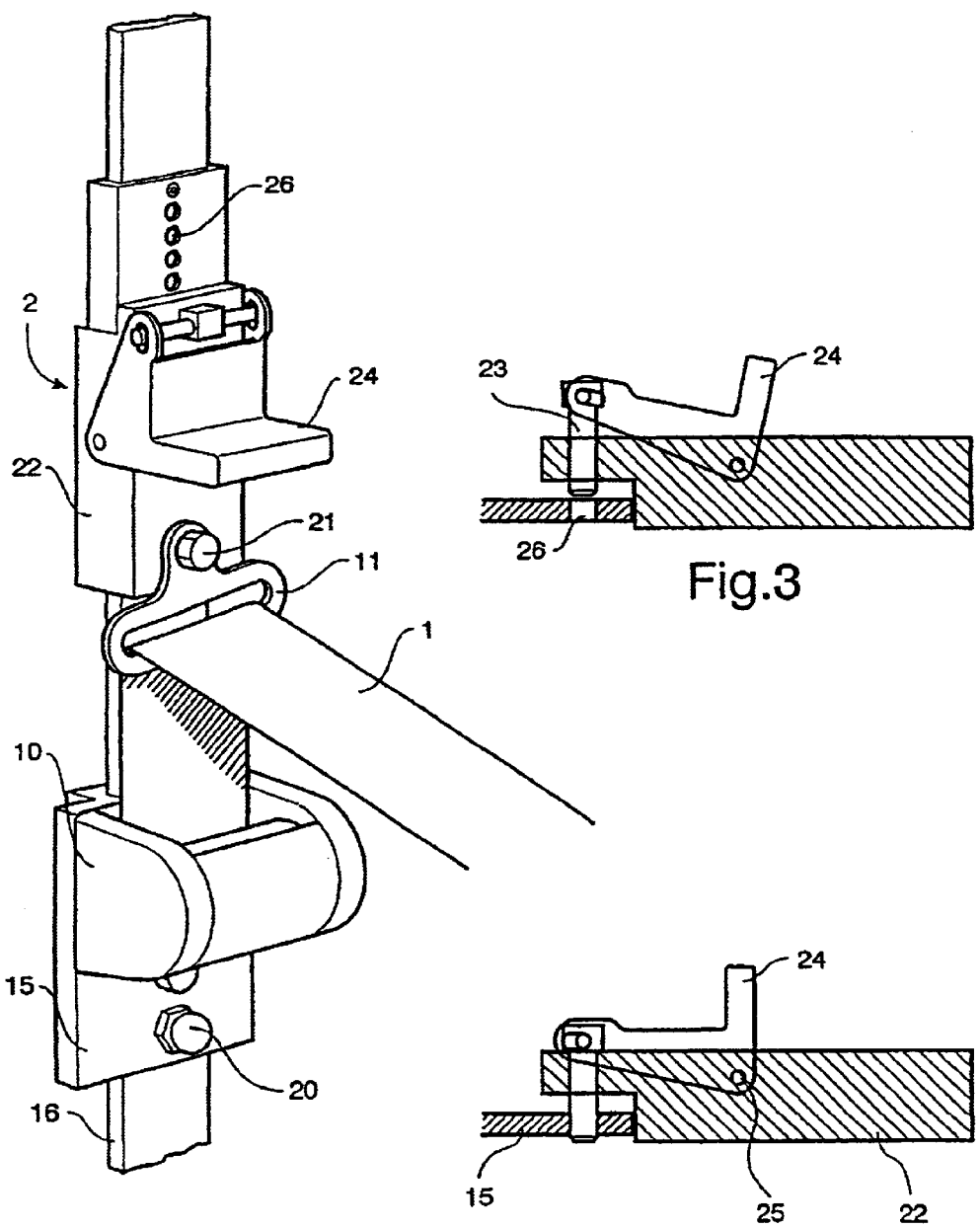

ARRANGEMENT AND METHOD FOR HEIGHT ADJUSTMENT OF THE UPPER ATTACHMENT POINT OF A SAFETY BELT

This application is the national phase under 35 U.S.C. § 371 of PCT International Application No. PCT/SE00/01892 which has an International filing date of Oct. 2, 2000, which designated the United States of America.

TECHNICAL FIELD

The present invention relates to an arrangement and a method for height adjustment of the upper attachment point of a safety belt, arranged in a vehicle with a vehicle seat which is spring-mounted in the vertical direction.

BACKGROUND ART

Height-adjusting arrangements for the upper attachment point of safety belts in vehicles are previously known. From U.S. Pat. No. 5,102,166, for example, a height-adjusting arrangement for the upper attachment point of a safety belt is previously known, where the movement of the attachment point is a function of the movement in the longitudinal direction of the vehicle of a seat arranged in the vehicle. The movement of the seat is transmitted via a wire to a slide which runs in a vertical guide groove which is arranged in the body of the vehicle and is positioned at shoulder height of a person sitting in said seat. Said guide groove comprises an upper and a lower end-position stop, which stops prevent the upper attachment point of the safety belt ending up too high or, respectively, low when the seat is located in its rear or, respectively, front position. The arrangement described above therefore means that when, for example, a tall person moves the seat backwards so as to achieve a suitable driving position, the upper attachment point is displaced upwards and in this manner takes up a position in the vertical direction which is optimum for said person.

However, this previously known height-adjusting arrangement has the disadvantage that the movement of the upper attachment point of the safety belt takes place only as a function of the movement of the seat in the longitudinal direction of the vehicle. As it is common, in particular in lorries, buses and various types of utility vehicle, to provide vehicle seats with spring-mounting in the vertical direction in order to improve the comfort of occupants of the vehicles, the height of the vehicle seat should also be taken into consideration for satisfactory adjustment of the upper attachment point of the safety belt.

From EP 447,364, it is previously known, in a vehicle with a vehicle seat which is spring-mounted in the vertical direction, to arrange the upper attachment point of the safety belt on the backrest of the vehicle seat, which results in the attachment point being correctly positioned irrespective of the springing movement of the vehicle seat.

Although the known arrangement provides good adaptation of the upper attachment point of the safety belt during the springing movement of said vehicle seat, it suffers from certain disadvantages. One disadvantage is that the construction of the vehicle seat is relatively complicated as it has to be provided with strong reinforcements. Another disadvantage is that the vehicle seat usually has to be provided with means, for example a wire extending between the vehicle seat and the floor of the vehicle, in order to limit the springing movement in the event of, for example, heavy braking of the vehicle. Furthermore, the abovementioned arrangement means that the floor of the vehicle has to be reinforced, which increases the weight of the vehicle.

DISCLOSURE OF INVENTION

The principal object of the present invention is therefore to provide an arrangement and a method for height adjustment of the upper attachment point of a safety belt, arranged in a vehicle with a vehicle seat which is spring-mounted in the vertical direction, where the upper attachment point is arranged so as to follow in the vertical direction the springing movement of said vehicle seal. This is achieved by means of an arrangement and a method of the type referred to in the introduction, the characteristic features of which emerge from independent claims 1 and 11.

Further advantages and objects of the invention can be understood with the aid of the claims below and the description below.

BRIEF DESCRIPTION OF DRAWINGS

The invention is described below in connection with preferred exemplary embodiments and the appended figures, in which FIG. 2 shows a height-adjustable deflection means of the present invention, FIG. 3 shows, partly in cross section, an operating lever with an associated locking pin in the released position, FIG. 4 shows, partly in cross section, said operating lever with the locking pin in the locked position.

MODE FOR CARRYING OUT THE INVENTION

Figure 1:
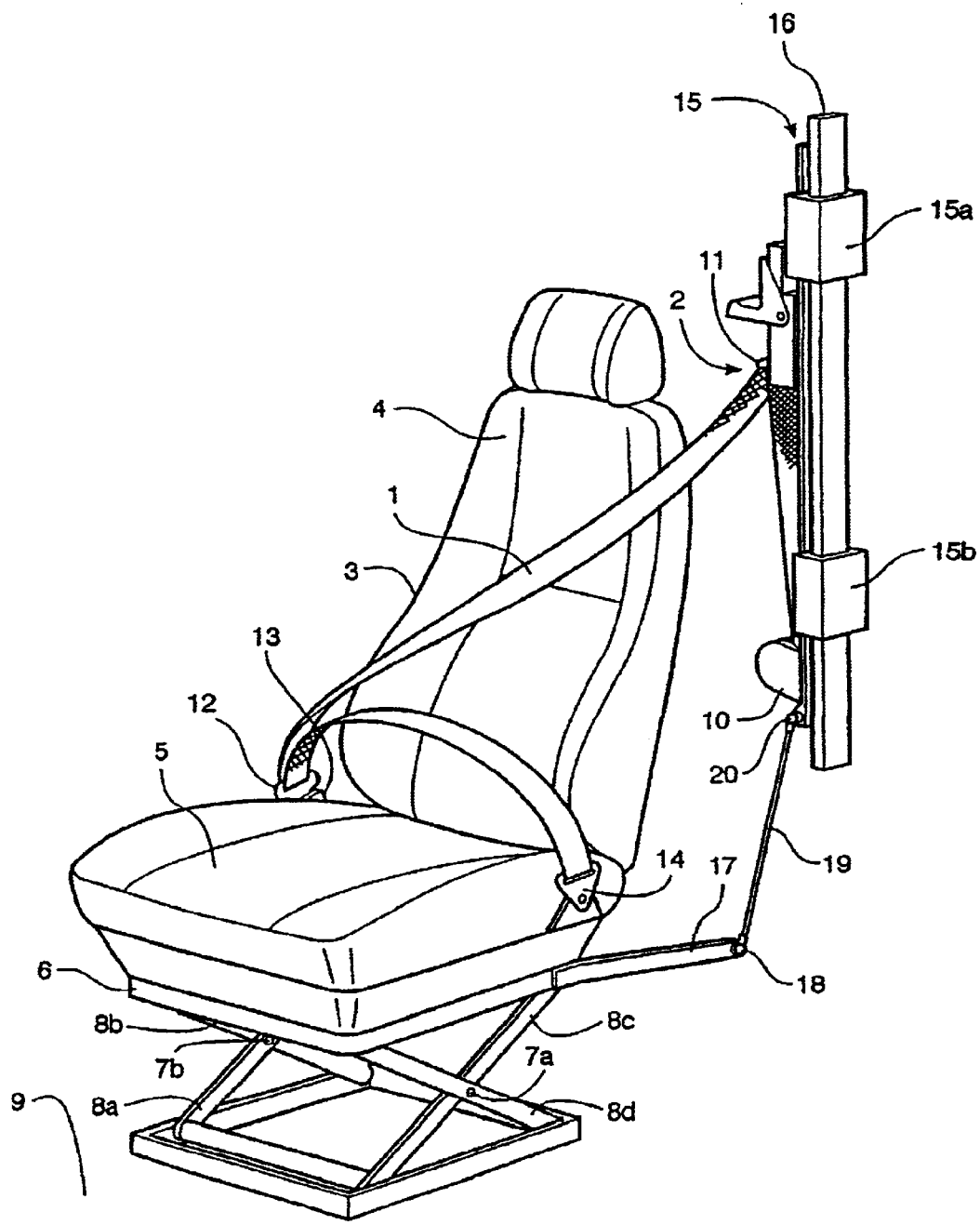
FIG. 1 shows a vehicle seat on which a first preferred embodiment according to the invention can be seen.

FIG. 1 shows a height-adjusting arrangement for the upper attachment point 2 of a safety belt 1 on a vehicle seat 3 which is arranged in a vehicle and comprises a backrest 4 and a sitting surface 5 attached to a seat underframe 6. The vehicle seat 3 is spring-mounted by means of a mounting arrangement having two pairs of intersecting link arms 8a, 8b, 8c, 8d interconnected in an articulated manner at points of intersection 7a, 7b, the link arm pairs 8a, 8b and 8c, 8d being arranged on opposite sides of the sifting surface 5 of the vehicle seat and being at their ends connected in such a manner to the seat underframe 6 and the vehicle floor 9 that the vehicle seat 3 is movable in the vertical direction relative to the vehicle floor 9, in addition to which spring means (not shown) are arranged so as to counteract the movement of the vehicle seat 3 in the direction towards the vehicle floor 9. A description of a vehicle seat according to the above is given in Swedish patent specification SE 366 505 which is incorporated herewith.

FIG. 1 also shows how the safety belt 1 runs out of a belt reel 10, and via an upper deflection means 11 arranged at said upper attachment point 2. From the deflection means 11, the belt extends, over the shoulder of an imaginary occupant, to a second, lower deflection means 12 with an associated belt lock 13, which is arranged in a fixed manner in relation to the sitting surface 5, and on, over the hip of an imaginary occupant, to a lower attachment point 14 arranged in a fixed manner in relation to the sitting surface.

According to a preferred embodiment, the upper deflection means 11 and the belt reel 10 are mounted in a fixed manner on a slide 15 which is arranged displaceably on a guide rail 16. The slide 15 surrounds the guide rail 16, which is of rectangular cross section, by means of sliding joints 15a, 15b which are shaped so as essentially to surround the guide rail 16 and are therefore designed with a corresponding rectangular cross section.

A first link arm 17 is attached rigidly to the seat underframe 6 and connected, via a link arm articulation 18, to a second link arm 19 which is in turn connected to the slide 15 by means of an articulated connection 20, springing movement of the vehicle seat 3 then bringing about displacement of the slide 15 and thus of the deflection means 11 arranged at the upper attachment point 2.

FIGS. 2, 3 and 4 show an especially preferred embodiment where the upper deflection means 11 is arranged adjustably in the vertical direction relative to the slide 15. In the embodiment shown, the upper deflection means 11 is attached by a screw connection 21 to a second slide 22 arranged displaceably on the slide 15. Said second slide 22 is provided with a locking mechanism comprising a locking pin 23 which is operated by an operating lever 24 which is attached pivotably at an articulation 25. When the lever is operated counter to spring means (not shown), the locking pin 23 is brought out of engagement with locking holes 26 arranged in the slide 15, movement of the slide 22 relative to the slide 15 then being made possible. As a result, it is possible to adjust the upper attachment point 2 to the desired height depending on the load (the weight of the occupant) on the sitting surface 5 and the height of the occupant.

Figure 5:
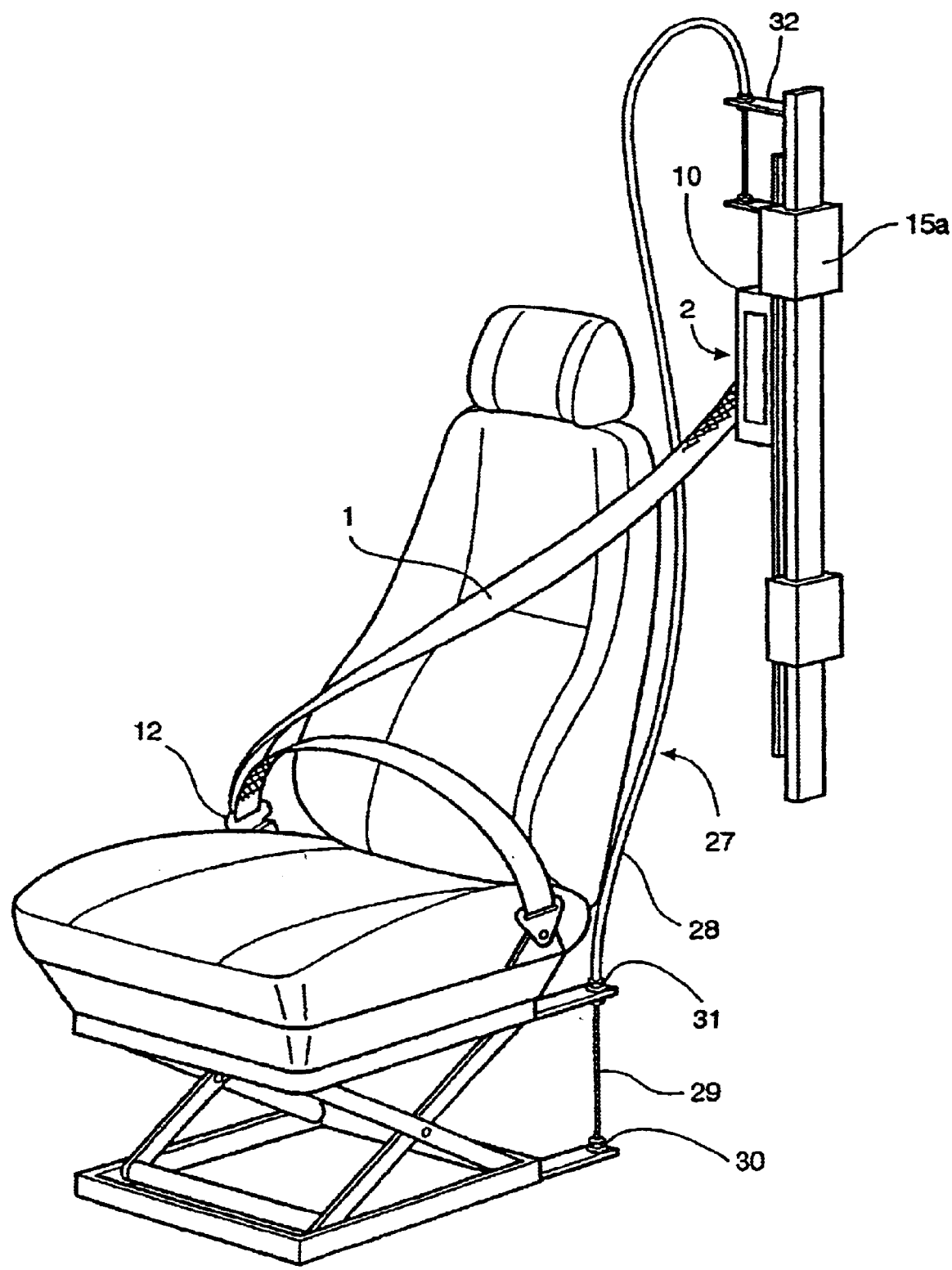
FIG. 5 shows a vehicle seat with an advantageous alternative embodiment of the present invention.

With reference to FIG. 5, an advantageous alternative embodiment for transmitting the springing movement of the vehicle seat 3 to the upper attachment point 2 of the safety belt according to the invention is described. In this embodiment, what is known as a push-pull cable 27, that is to say a cable consisting of an outer covering 28 and a wire 29 which can transmit both tensile and compressive force, is arranged so as to transmit the springing movement of the vehicle seat to the upper attachment point 2. One end of the wire 29 is attached to a wire attachment 30 arranged in a fixed manner in relation to the vehicle floor 9, and its other end is attached to the slide 15, in addition to which one end of the outer covering 28 is attached firmly to an attachment 31 arranged in a fixed manner in relation to the seat underframe 6, and its other end is attached to an attachment 32 arranged in a fixed manner in relation to the guide rail 16.

FIG. 5 also shows an advantageous alternative embodiment, according to the present invention, of the upper attachment point 2 of the safety belt, where the safety belt 1 runs out of a belt reel 10, over the shoulder of an imaginary occupant and, as already mentioned, on down to the second, lower deflection means 12. The result of this is that no upper deflection means is required and that the total length of the safety belt 1 can be made shorter.

Figure 6:
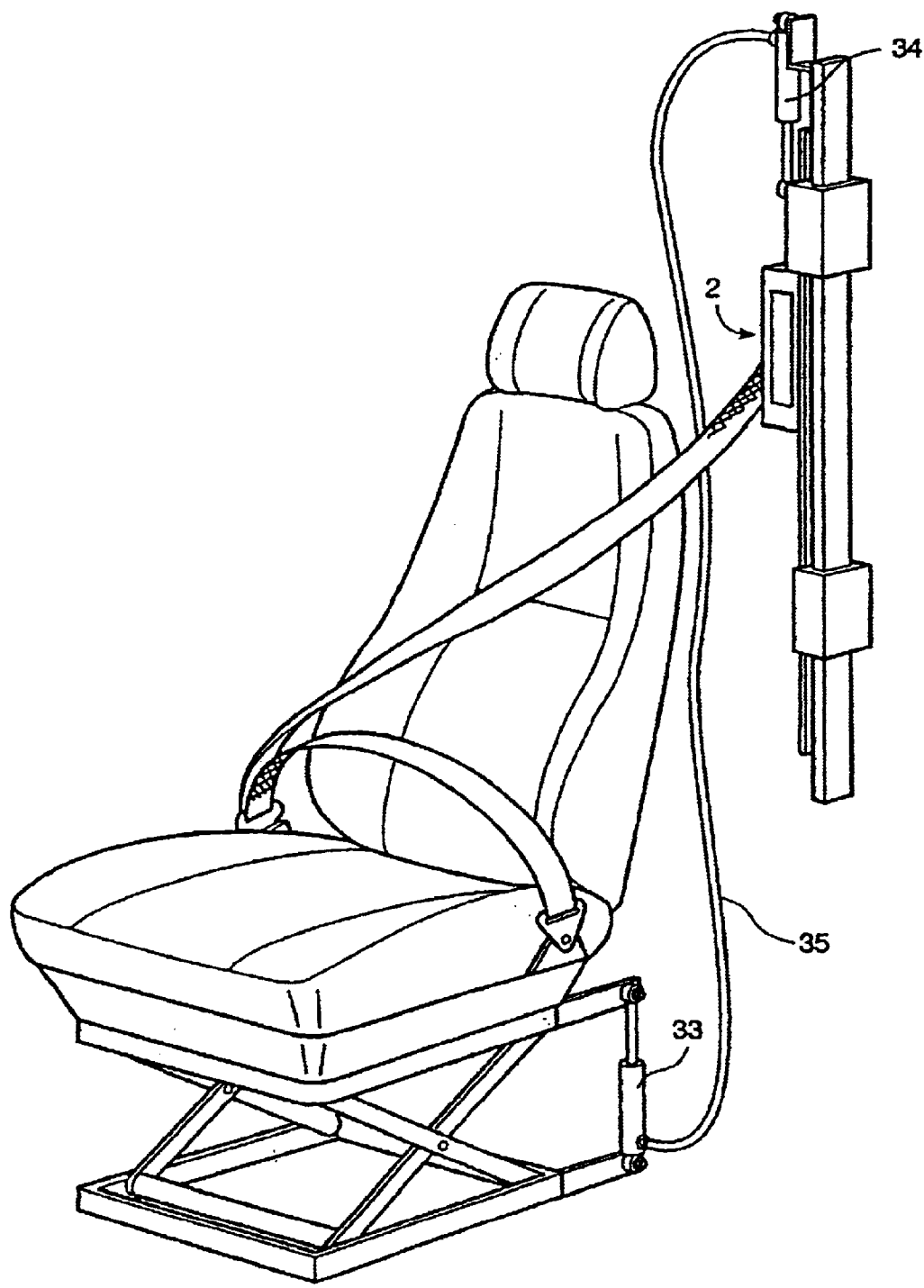
FIG. 6 shows a vehicle seat on which a further advantageous alternative embodiment according to the invention can be seen.

FIG. 6 shows a further advantageous alternative embodiment for transmitting the springing movement of the vehicle seat 3 to the upper attachment point 2 of the safety belt according to the invention. In this embodiment, a first hydraulic piston/cylinder assembly 33 is arranged between the seat underframe 6 and the vehicle floor 9, and a second hydraulic piston/cylinder assembly 34 is arranged between the slide 15 and the guide rail 16. Said first and second hydraulic piston/cylinder assemblies 33, 34 are coupled to one another, by a line 35, so that compression of the first hydraulic piston/cylinder assembly results in a corresponding linear expansion of the second hydraulic piston/cylinder assembly, and thereby causing vertical displacement of the slide 15.

The invention is not limited to the exemplary embodiments described above and shown in the figures, but can be varied within the scope of the claims below. For example, the springing movement of the vehicle seat can be detected by an electric sensor and then recreated, at the upper attachment point of the safety belt, by an electric motor. Furthermore, said guide rail and slide can be designed with a different, for example circular, cross section.

What is claimed is:

1. A height-adjusting arrangement for an upper attachment point of a safety belt wherein the said upper attachment point is affixed to a slide which is displaceably arranged on a guide rail, arranged in a vehicle with a vehicle seat which is spring-mounted so as to move in a generally vertical direction, by means of a mounting arrangement having pairs of intersecting link arms and articulated points of intersection, comprising: said upper attachment point being mounted for displacement also in a generally vertical direction in the body of the vehicle adjacent the seat and being connected to said vehicle seat via vertical seat movement transmitting means for causing the spring induced movement of the vehicle seat in said vertical direction to bring about a corresponding vertical displacement of said upper attachment point.

2. The height-adjusting arrangement for the upper attachment point of a safety belt according to claim 1, wherein said movement-transmitting means comprise a link arm arrangement arranged between the vehicle seat and the upper attachment point.

3. The height-adjusting arrangement for the upper attachment point of a safety belt according to claim 2, wherein said movement-transmitting means comprise a first link arm attached to the vehicle seat and connected, via a link arm articulation, to a second link arm which is connected to said upper attachment point.

4. The height-adjusting arrangement for the upper attachment point of a safety belt according to claim 1, wherein said movement-transmitting means comprise a push-pull cable, the first end of which is connected to the vehicle seat and the second end of which is connected to the upper attachment point.

5. The height-adjusting arrangement for the upper attachment point of a safety belt according to claim 1, wherein said movement-transmitting means comprise a first hydraulic arrangement arranged on the vehicle seat and a second hydraulic arrangement arranged at the upper attachment point and a hydraulic circuit which interconnects said first and second hydraulic arrangements.

6. The height-adjusting arrangement for the upper attachment point of a safety belt according to claim 5, wherein said first hydraulic arrangement comprises a hydraulic piston/cylinder assembly arranged on the vehicle seat.

7. The height-adjusting arrangement for the upper attachment point of a safety belt according to claim 5 wherein said second hydraulic arrangement comprises a hydraulic piston/cylinder assembly arranged at the upper attachment point.

8. The height-adjusting arrangement for the upper attachment point of a safety belt according to claim 1 and further comprising a belt reel (10) located adjacent the upper attachment point.

9. The height-adjusting arrangement for the upper attachment point of a safety belt according to claim 1 wherein the upper attachment point includes deflection means for the safety belt.

10. A method for height adjustment of an upper attachment point of a safety belt, located in a vehicle having a spring mounted vehicle seat which displaceable in a generally vertical direction, comprising the steps of: locating the upper attachment point for displacement in a generally vertical direction in the vehicle in proximity to the vehicle seat, connecting the vehicle seat to the upper attachment, and displacing the upper attachment point vertically as a function of the vertical spring displacement of the vehicle seat in the form of a mounting arrangement having pairs of intersecting link arms and articulated points of intersection.

11. A method for height adjustment of the upper attachment point of a safety belt according to claim 10, wherein the displacing of the upper attachment point is a linear function of the springing movement of the vehicle seat.

\* \* \* \* \*